United States Patent [19]
Boni et al.

[11] Patent Number: 5,089,607
[45] Date of Patent: Feb. 18, 1992

[54] PROCEDURE FOR THE SEPARATION OF STARCH FROM A RESIDUAL FLOW OF THE STARCH PREPARATION AND STARCH THUS OBTAINED

[75] Inventors: Luc E. Boni, Buggenhout; Frank R. Van Lancker, Ghent, both of Belgium

[73] Assignee: Amylum, naamloze vennootschap, Brussels, Belgium

[21] Appl. No.: 454,621

[22] Filed: Dec. 21, 1989

[30] Foreign Application Priority Data

Jan. 9, 1989 [BE] Belgium ................................ 8900020

[51] Int. Cl.$^5$ ...................... C08B 30/00; C08B 31/00
[52] U.S. Cl. ..................................... 536/102; 536/124; 536/127; 127/65; 127/67; 127/68; 127/69; 127/70; 127/71
[58] Field of Search .................... 536/102, 124, 127; 127/65–71

[56] References Cited

U.S. PATENT DOCUMENTS

| | | | |
|---|---|---|---|
| 1,794,105 | 2/1931 | David et al. | 127/67 |
| 2,141,562 | 12/1938 | Shurback | 127/68 |
| 2,642,185 | 6/1953 | Fontein | 127/71 |
| 2,821,501 | 1/1958 | Simpson | 435/275 |
| 2,829,988 | 4/1958 | Bus et al. | 536/102 |
| 2,987,424 | 6/1961 | Olnick | 127/67 |
| 3,909,288 | 9/1975 | Powell et al. | 127/67 |
| 4,042,414 | 8/1977 | Goering et al. | 127/68 |
| 4,171,384 | 10/1979 | Chwalek et al. | 127/68 |
| 4,579,944 | 4/1986 | Harvey et al. | 127/71 |

FOREIGN PATENT DOCUMENTS

| | | |
|---|---|---|
| 0201226 | 11/1986 | European Pat. Off. . |
| 0228732 | 7/1987 | European Pat. Off. . |
| 804908 | 5/1951 | Fed. Rep. of Germany . |

OTHER PUBLICATIONS

Chemical Abstracts, vol. 69, No. 15, Oct. 7, 1968, p. 5452, No. 58463u.
"Enzymolysis of Pentosans of Wheat Flour" & Cereal Chem 1968.
"Enzymatische Behandlung Von abwassern der Weizenstarkeindustrie", by Von A. J., 45(4), 339–350.

*Primary Examiner*—Ronald W. Griffin
*Attorney, Agent, or Firm*—Foley & Lardner

[57] ABSTRACT

The residual flow of the starch preparation from wheat, rye, oats or barley is thickened to a dry material content of 17 to 25 weight % after which an enzyme preparation with pentosanase activity, originating from fungi or yeasts, is added. The enzyme preparation is allowed to react for 0.5 to 4 hours with a pH of 2.6 to 3.7 and at a temperature between 30 and 50° C. and the starch fraction is separated afterward with an increased yield. The starch thus obtained is a calibrated, fine grained starch of which at least 90 weight % of the grains have a diameter of 3 to 12 micrometer.

9 Claims, No Drawings

PROCEDURE FOR THE SEPARATION OF STARCH FROM A RESIDUAL FLOW OF THE STARCH PREPARATION AND STARCH THUS OBTAINED

The invention relates to a procedure for the separation of starch from a residual flow of the starch preparation from grain from the group of wheat, rye, barley and oats according to which procedure an enzyme preparation that shows pentosanase activity is added and allowed to react on the residual flow, and this residual flow is afterward separated into a starch fraction and a shunt flow.

A customary procedure for the preparation of starch from wheat for example consists in that the wheat is ground to flour and the gluten is separated from this through washing. From the residual starch flow developed with that the greater part of the starch is separated through centrifuging. The liquid residual flow still contains significant quantities of starch which is enriched with the fine grained fraction The residual flows contain quite significant amounts of protein and pentosans apart from starch.

In practice only a part of the starch present is recuperated from these flows via known means such as separation through centrifuging or decanting. After a significant part of the starch present has been removed by centrifugation, a shunt flow is obtained which still always contains a significant amount of especially fine grained starch, apart from increasing amounts of protein, pentosans and other impurities. Such shunt flow can, after thickening, again be separated, but the yield is low, while the purity leaves something to be desired and is unacceptable for further processing, such as saccharification. Such shunt flows are therefore processed as cattle feed component and sold at low prices.

According to the procedure of the type defined at the beginning an increased starch separation from the residual flow and thus a higher yield is already obtained.

A similar procedure is briefly mentioned in U.S. Pat. No. 2,821,501.

However, in that a procedure for the preparation of pentosanases from various Bacillus phyla is principally described and a procedure according to which these enzymes are there added to the liquid starch flow itself in order to be able to separate the starch fraction from it with a greater efficiency.

The possibility of adding the pentosanases to the residual flow, obtained after the separation of a first starch fraction, is only very briefly mentioned as a possibility. In none of the examples is this possibility further described.

It is emphasized that the pentosanases must be allowed to react under the optimum pH and temperature conditions, namely with a pH situated between 6 and 7 and a temperature preferably between 30° and 35° C. With a pH lower than 5 or higher than 8 the enzymes would be inactive.

From microscopic examination of starch obtained via the procedure according to U.S. Pat. No. 2,821,501 it appears that a notable part of the grains are corroded and that these grains show a weakened polarization cross. It further appears from Coulter Counter results that a notable part of the grains are larger than 12 micrometer.

An alternative procedure for the separation of starch from shunt flows is described in EP-A2-0 201 226. According to this procedure use is made of an alkaline extraction. This procedure is thus not of the type intended here. With this alkaline extraction a part of the grains are swelled out or affected This procedure has furthermore still the disadvantage that after the alkaline treatment a neutralization must be performed, through which the washing water is charged with minerals, while an additional washing is necessary in order to remove residual salt from the starch There further remain problems with the thickening of the effluents containing pentosans.

The purpose of the invention is to remedy these disadvantages and to provide a procedure of the type mentioned in the introduction which allows starch of good quality to be separated from shunt flows of the starch preparation in a simple manner and with a high yield.

For this purpose, prior to adding the enzyme preparation, the residual flow is thickened to a dry material content of 17 to 25 weight % and the enzyme preparation is allowed to react for 0.5 to 4 hours with a pH of 2.6 to 3.7 and at a temperature between 30 and 50° C.

In a surprising manner the application of the enzyme preparation under the aforementioned reaction conditions gives a notably higher starch yield than when the operation occurs under the optimum working conditions given by the supplier of the enzymes.

An additional unexpected advantage of the procedure consists in that the starch fraction obtained consists of a calibrated, fine grained starch, this signifies that at least 90 weight % of the grains have a diameter of 3 to 12 micrometer.

The starch obtained is as far as the granulometry is concerned practically identical to rice starch, has a higher purity and contains little or no affected grains.

Because of the granulometry this fine grained starch has particular applications among others in cosmetics, as starches, in specific types of paper and in biodegradable synthetic materials.

Such pure fine grained starch was up until now obtained through the fine starch fraction with grains with a diameter of 3 to 10 micrometer (25 to 30 weight % of wheat starch) to be separated from wheat starch. As among others described in U.S. Pat. No. 2,642,185 this can occur by means of a hydro-cyclone through which a strongly diluted solution of the starch is fed. The separation of the fine starch fraction is however not simple and entails a great use of water.

In a particular embodiment of the invention the starch fraction obtained is washed and dried.

In a notable embodiment of the invention an enzyme preparation originating from an organism from the group of the fungi and the yeasts is employed.

Suitable organisms are organisms from the group of *Aspergillus niger, Trichoderma viride, Trichoderma reesei, Penecillium emersonii* and *Humicola insolens*.

Regarding starch, wheat starch is particularly suitable for the performance of the procedure according to the invention.

In an efficient embodiment of the invention the enzyme preparation is allowed to react with a pH of 3.0 to 3.4.

The invention also relates to the starch obtained according to the procedure according to one of the preceding embodiments.

Other details and advantages of the invention will appear from the following description of a procedure for the separation of starch from a residual flow of a starch preparation and a starch thus obtained according to the invention; this description is only given as an example and does not restrict the invention.

With the separation of wheat flour in starch and vital gluten a residual starch flow is obtained. This starch flow obtained after the gluten washing is, in its turn, possibly after thickening, separated for example through centrifuging, into a starch fraction and a residual flow.

In order to remove a large part of the starch still present in this residual flow, the procedure is as follows:

This residual flow is thickened to a dry material content of 17 to 25 weight %.

The dry material of the thickened residual flow is composed of 65 to 75 weight % of starch, 4 to 6 weight % of protein, 4 to 6 weight % of pentosans, 10 to 15 weight % of soluble materials, 1 to 2 weight % of lipids, fibers, ash and a few other materials.

This starch is difficult to dry. Saccharification of this starch leads to problems during the refining of the syrups obtained.

To the thickened residual flow an enzyme preparation is now added that shows pentosanase activity, whereby the pH is established between 2.6 and 3.7 and preferably between 3.0 and 3.4.

The enzyme preparation is allowed to react at a temperature of 30° to 50° C. and preferably at a temperature of 38° to 42° C. and this for 0.5 to 4 hours and preferably 1 to 2 hours.

The enzyme preparations which show a pentosanase activity, were obtained from fungi or yeasts. Similar preparations which are commercially available and for example are obtained from *Aspergillus niger, Trichoderma viride, Trichoderma reesei, Penecillium emersonii* and *Humicola insolens* are employed.

One or more of these enzyme preparations is allowed to react under conditions which clearly differ from the reaction conditions given by the suppliers. By the suppliers values of pH are given between 4.5 and 5.5 at a temperature between 40° and 60° C. and preferably around 50° C.

The suspension obtained is separated after this enzymatic treatment with the assistance of a centrifuge or a decanter into a starch fraction and a second residual flow after which the starch fraction is washed and dried.

Suitable enzyme preparations are for example the preparation MKC Developmental Product Pentosanase from Miles Kali-Chemie GmbH & Co. K.G. from Germany. This supplier recommends pH values between 4 and 6 and temperatures between 40° and 70° C. and preferably around 55° C.

Another suitable enzyme preparation is Xylanase 500 from Rapidase B.V. from Holland, which supplier recommends a pH of 3 to 6 and preferably 4.7 at a temperature of 55° C.

Yet another suitable enzyme preparation is the preparation brought onto the market by Biocom Ltd under the name Biopentosanase X. This supplier gives a pH region of 3.5 to 5.5 at a temperature of 50° to 55° C.

In a surprising manner it was determined that by operating under other circumstances, the recuperation of starch from the residual flow with an increased efficiency of 10 to 40% can be effected in relation to the starch recuperated under the optimum operating conditions given by the enzyme suppliers.

These yields are determined by centrifugation of the suspension obtained after the enzymatic treatment.

With that three layers develop an upper liquid fraction which contains soluble materials, a layer of slime which contains residual starch combined with pentosans and protein and a layer of starch with high purity. The amount of starch in this last layer is then a measure for the yield.

Starch suspensions not treated with an enzyme preparation or starch suspensions which were treated with the same enzyme preparation but with a pH between 4.5 and 5.5 clearly gave a lower yield.

It was likewise found that the concentrations of soluble materials in the upper fraction of a untreated sample and a sample that was treated according to the invention, were practically the same.

When, however, pH values of 4.0 to 5.0 were employed, thus not according to the invention, a clear increase of soluble material appeared. This increase was caused through the rise of the maltose and maltotriose concentration in this upper liquid fraction.

This increase of sugars must be attributed to starch degradation, which leads to a loss of yield that can amount to 5 to 20 % of the starch present.

Reduction of the reaction time could reduce the content of insoluble sugars but an increased starch yield was not found.

Reaction temperatures higher than 50° C. during the reaction of the enzyme preparation are not suitable due to the risk of stiffening of the starch present.

Through the reaction of the enzyme preparation under the above mentioned conditions according to the invention 40 to 80 weight % of the starch present in the residual flow can, according to the composition of the residual flow, be separated.

After washing of the starch fraction a pure starch product is obtained consisting of 97 to 98 weight % of starch, 0.3 to 0.5 weight % of protein, 1 to 1.5 weight % of total lipids and 0.3 to 0.5 weight % of ash.

Not only is a pure starch product obtained but it was also determined by means of Coulter Counter analyses that the starch obtained is composed of grains of which 90 weight % have a diameter which is situated between 2 and 12 $\mu$m. Expressed in numbers more than 99.5% of the grains appear to have a diameter between these limits.

By working with the enzymatic treatment under the preferred conditions of pH and temperature, a starch fraction is even obtained which is composed of grains of which at least 90%, on weight basis, have a diameter between 3 and 10 $\mu$m and of which 99% likewise on weight basis, have a diameter between 2 and 12 $\mu$m.

According to the procedure described above according to the invention a calibrated fine grained wheat starch is thus obtained with a granulometry analogue to that of rice starch.

Microscopic examination of the starch fraction obtained according to the invention clearly indicates that no attack on the grains has taken place. Microscope filming under polarized light of the starch obtained according to the invention and of the starch obtained through alkaline extraction or enzymatic treatment with the optimum reaction conditions prescribed by the suppliers, clearly shows that with the first mentioned starch little or no large grains are present, that the grains are not affected and show a clear polarization cross, this in contrast to the other starches.

It was determined that the yield and the purity of the starch obtained is somewhat dependent upon the adjustment of the centrifuge or decanter employed A centrifuge with high g-value and a rather low variable speed of the screw is employed In function of the desired starch quality this adjustment can be altered.

The invention will be further illustrated hereafter with the help of the following examples:

EXAMPLES 1 through 3

The residual starch flow obtained through the separation of wheat flour into vital gluten and starch was thickened from 4 weight % of dry material to 18 weight % of dry material. This starch flow was subsequently centrifuged in order to remove the free starch present. The residual flow obtained was then in its turn thickened to a concentration of 18 weight % of dry material.

The starch content calculated on the dry material of the thickened residual flow amounted to 68 weight % and the protein content to 3.9 weight %.

Three samples were taken from this thickened residual flow.

No enzyme was added to one of the samples (example 1).

To the second sample 0.1 ml per kg of dry material Biopen ® was added (example 2).

To the third sample 7.5 mg per kg of dry material MKC pent was added (example 3).

With the example 2 and 3 the enzyme was allowed to react for two hours at 45° C. The pH of the residual flow was adjusted to pH 3.4.

Subsequently the flow was centrifuged for 5 minutes with a laboratory centrifuge at 3000 revolutions per minute.

The amount of upper liquid slime fraction and starch fraction was then determined just like the content of dry material of it. From that an amount of material which is present in each of these layers was then calculated.

The results are shown in the following table:

| example | upper liquid | slime fraction (sludge) | starch fraction | yield |
|---------|--------------|-------------------------|-----------------|-------|
| 1 | 8.6% | 83.4% | 8% | 11.8% |
| 2 | 11.3% | 51.5% | 37.2% | 54.7% |
| 3 | 11.6% | 46.3% | 41.1% | 60.4% |

The different percentages are the share of the dry material which was found back in the different layers, while the starch yield was obtained by dividing this amount of starch by the starch content of the original material.

From these three examples the influence of the enzyme reaction according to the invention clearly appears, in relation to an untreated sample.

EXAMPLES 4 through 7

An analogue residual flow to that in the examples 1 through 3 was used but with a slightly different composition. This residual flow was now thickened to a dry material content of 23.3 weight %. The starch content of the dry material amounted to 75 weight % and the protein content to 3.4%.

To this residual flow 40 mg per kg of dry material Xylanase ® was added. The enzymatic reaction was performed for 2 hours at 40° C. and with different pH values.

For the different examples the pH values as well as the results are shown in the following table.

The percentages indicated are again the amounts of dry material which are present in the respective layers, this in relation to the total dry material of the original material.

| example | pH | upper liquid | slime fraction (sludge) | starch fraction | yield |
|---------|-----|--------------|-------------------------|-----------------|-------|
| 4 | 3.0 | 7.0% | 39% | 54% | 72% |
| 5 | 3.5 | 6.5% | 39.2% | 54.3% | 72.4% |
| 6 | 4.0 | 9.9% | 41.6% | 48.5% | 64.7% |
| 7 | 4.5 | 10.8% | 41.8% | 47.7% | 63.6% |

Examples 6 and 7 were performed with a pH higher than 3.7 and as a result do not satisfy the conditions of the invention.

From these examples it clearly appears that at least 10% more starch can be recuperated when the operation is effected according to the invention and that in total more than 70 weight % of the original starch present can be recuperated.

A Coulter Counter analysis of the product with pH 3 and pH 4.5 are shown in the following table. The percentages are expressed in weight percent.

| diameter | pH = 3 | pH = 4.5 |
|----------|--------|----------|
| 2–5 u | 48.5% | 32.2% |
| 6–9 u | 44.5% | 47.9% |
| 10–12 u | 7% | 11.9% |
| >12 u | — | 8% |

EXAMPLES 8 through 11

In these examples a part of the residual flow thickened to a dry material content of 18 weight % from the examples 1 through 3 was used mixed with the effluents obtained after separation of another part of this thickened residual flow, without enzymatic treatment, into a starch rich fraction and effluents.

The mixed flows were thickened to a dry material content of 17.3 weight %. The dry material contained 65 weight % of starch and 3.5 weight % of protein This thickened flow was treated as follows

EXAMPLE 8

No treatment at all.

EXAMPLE 9

An enzymatic treatment for two hours at 40° C. and with a pH of 3.0 with 0.2 ml per kg of dry material of the commercial pentosanase Biopen ®.

EXAMPLE 10

An enzymatic treatment for two hours at 40° C. and a pH of 4.5 with 0.2 ml per kg of dry material of the aforementioned pentosanase Biopen.

EXAMPLE 11

An alkaline treatment such as described in EP 201 226.

Only example 9 is according to the invention.

The results obtained are shown in the following table.

| example | upper liquid | slime fraction (sludge) | starch fraction | yield |
|---------|--------------|-------------------------|-----------------|-------|
| 8 | 14.2% | 85.8% | — | — |

-continued

| example | upper liquid | slime fraction (sludge) | starch fraction | yield |
|---|---|---|---|---|
| 9 | 17.5% | 56.2% | 26.3% | 40.5% |
| 10 | 21.3% | 56.9% | 21.8% | 33.5% |
| 11 | 11.7% | 73.2% | 15.1% | 23.2% |

The starch samples obtained were washed and evaluated on their particle size distribution via Coulter Counter analysis.

The results of this are shown in the following table.

The granule size distribution was expressed in weight percent.

|  | pH = 3 | pH = 4.5 | alkaline |
|---|---|---|---|
| 2–6 u | 56% | 49% | 10% |
| 6–10 u | 30% | 28% | 8% |
| 10–12 u | 6% | 7% | 7% |
| >12 u | 8% | 16% | 75% |

Microscopic examination of the starch grains demonstrated clearly that with a pH of 4.5 the grains are more affected, show a less clear polarization cross and are swelled out to a larger degree.

The best results were clearly obtained with a pH of 3, that is thus the treatment according to the invention.

According to the described examples according to the invention not only a greater starch yield is obtained but also a starch that is calibrated and fine grained.

The invention is in no way restricted to the embodiments described above, and within the scope of the invention many changes can be applied to the described embodiments.

In particular the procedure is not necessarily limited to the separation of starch from the residual flow of the wheat starch preparation.

Also the residual flows from the preparation of starch from other grains such as wheat, rye, barley and oats can be treated according to the invention.

We claim:

1. Procedure for the separation of starch from a residual flow of the starch preparation from grain from the group of wheat, rye, barley and oats, according to which procedure an enzyme preparation that shows pentosanase activity is added and allowed to react on the residual flow and this residual flow is afterward separated into a starch fraction and a shunt flow, characterized in that prior to adding the enzyme preparation, the residual flow is thickened to a dry material content of 17 to 25 weight % and the enzyme preparation is allowed to react for 0.5 to 4 hours with a pH of 2.6 to 3.7 and at a temperature between 30° and 50° C.

2. Procedure according to claim 1, characterized in that the starch fraction obtained is washed and dried.

3. Procedure according to claim 1 characterized in that an enzyme preparation originating from an organism from the group of the fungi and the yeasts is employed.

4. Procedure according to claim 3, characterized in that an enzyme preparation originating from the group of *Aspergillus niger*, *Trichoderma viride*, *Trichoderma reesei*, *Penecillium emersonii* and *Humicola inslens* is employed.

5. Procedure according to claim 1 characterized in that a residual flow originating from the washing out of gluten from wheat starch is used.

6. Procedure according to claim 5, characterized in that as residual flow to which the enzyme preparation is added a residual flow is used which is obtained after the separation of the starch fraction from a residual starch flow obtained after the gluten washing.

7. Procedure according to claim 1 characterized in that the enzyme preparation is allowed to react for 1 to 2 hours.

8. Procedure according to claim 1 characterized in that the enzyme preparation is allowed to react with a pH of 3.0 to 3.4.

9. Procedure according to claim 1 characterized in that the enzyme allowed to react at a temperature of 38° to 42° C.

* * * * *